E. W. PHILBROOK.
UNDER WAIST.
No. 9,971. Reissued Dec. 13, 1881.
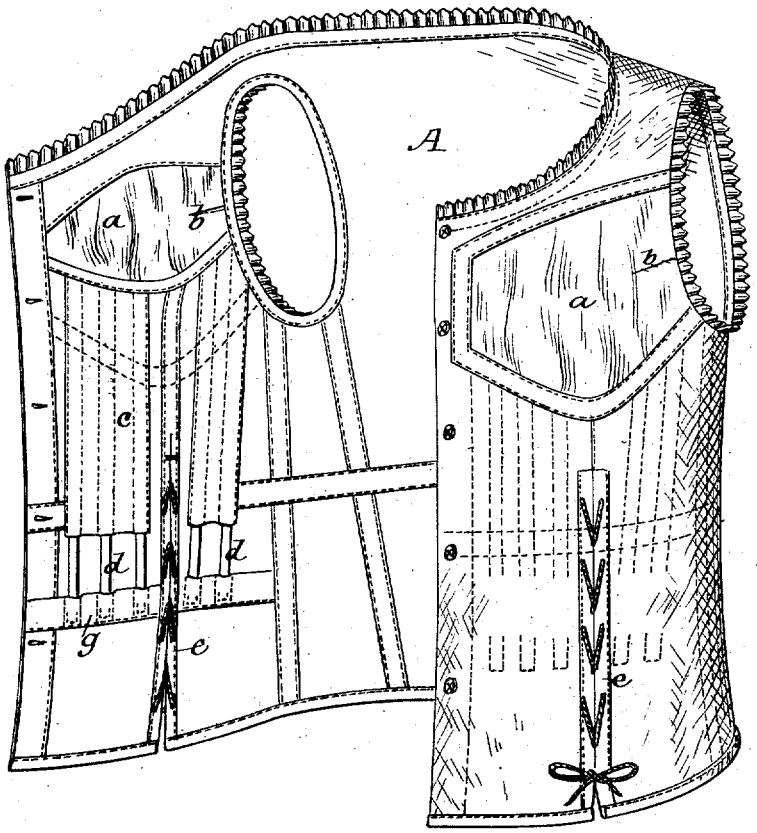
Witnesses
E. E. Masson
Philip Pellaw
Inventor:
Emeline W. Philbrook
by A. Pollok
her attorney.
N. PETERS, Photo-Lithographer, Washington, D. C.

UNITED STATES PATENT OFFICE.

EMELINE W. PHILBROOK, OF BOSTON, MASSACHUSETTS.

UNDERWAIST.

SPECIFICATION forming part of Reissued Letters Patent No. 9,971, dated December 13, 1881.

Original No. 184,545, dated November 21, 1876. Application for reissue filed June 7, 1881.

*To all whom it may concern:*

Be it known that I, EMELINE W. PHILBROOK, of Boston, in the county of Suffolk and State of Massachusetts, have invented certain new and useful Improvements in Women's Underwaists, of which the following is a specification.

Having found the waists for girls described in my Letters Patent No. 175,154, dated March 21, 1876, of material value and importance for proper growth and form, and for the support of the body without the use of corsets, I was led, by considering the evils attending the use of corsets and of other modes of dress around the waist, to so improve and modify my patented waist as to adapt it for females of more mature age and growth.

In my improved waist, which I call the "equipoise waist," I have secured all the advantages of defense or protection of the stomach which corsets secure without the confinement and pressure they exert on the chest and bowels, and the consequent muscular contraction or disarrangement of circulation, often injuriously affecting digestion and producing feminine weaknesses.

The accompanying drawing represents an underwaist embodying my invention.

The waist A opens in front, as shown. In it I use all the improvements described in my Letters Patent aforesaid, and I add an original-shaped covering, *a*, for the bosom by curving the same at both top and bottom, the top being gathered and the bottom fullness graduated by small plaits. This covering thus formed is shaped to the arm-size, and a gored seam, *b*, running from the same, removes the fullness at that point.

For the support and defense of the stomach and chest, and to give shape to the figure, as well as protection against the pressure of clothing, I simply introduce bones *d* in a plain gored piece, *c*, on each side, applied to the inside of the waist and extending up under the full bosom-piece, so arranged that they can be easily removed for washing. For this purpose the pockets that receive the bones are not continuous, but are formed of long open pockets to receive the main portion of the bones, and small independent pockets separated by a suitable distance from the openings of the long pockets, so as to confine the free ends of the bones, and at the same time permit the ready removal and replacement of the bones by means of the exposed intermediate portion of each. As shown, the long pockets are formed by the piece *c* and the small independent pockets by the strip *g*. These bones, applied in this manner, enable me to dispense with springs altogether, thus giving a waist with all the advantages of a corset and none of its disadvantages, and making a garment as easily changed and washed as any other article of underwear.

The side pieces for the back and front are so fitted that they shape to the figure without bias-seams under the arm at the waist-line.

Lacing *e* may be applied on each side of the front.

The bosom-pieces control the shape of the bosom, while the application, in the manner described, of bones in a plain gored piece extending up under the bosom-pieces protects and upholds the breast, preventing a draft upon the muscles, which exhausts the vital powers of the chest.

What I claim, and desire to secure by Letters Patent, is—

1. In an underwaist constructed substantially as described and shown, the combination of bosom-pieces with bones arranged in plain gored pieces extending up under the bosom-pieces, substantially as and for the purposes set forth.

2. In an underwaist, long open pockets to receive the main portion of the bones, combined with independent small pockets separated by a sufficient distance from the openings of the long pockets, so as to confine the free ends of the bones, and at the same time to allow of the ready grasping and bending of the same for removal and replacement, substantially as described and shown.

In testimony whereof I have hereunto signed my name in presence of two subscribing witnesses.

EMELINE W. PHILBROOK.

Attest:

S. M. ALLEN,

ALICE E. WITHAN.